(12) United States Patent
Liu et al.

(10) Patent No.: US 10,752,064 B2
(45) Date of Patent: Aug. 25, 2020

(54) FIXTURE FOR ECCENTRIC CLAMPING OF WHEEL

(71) Applicant: CITIC Dicastal CO., LTD., Qinhuangdao, Hebei (CN)

(72) Inventors: Weidong Liu, Qinhuangdao (CN); Fengyan Liu, Qinhuangdao (CN); Jiandong Guo, Qinhuangdao (CN); Xiaoguang Huang, Qinhuangdao (CN); Yao Zheng, Qinhuangdao (CN); Xiao Liu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 244 days.

(21) Appl. No.: 16/111,983

(22) Filed: Aug. 24, 2018

(65) Prior Publication Data

US 2019/0061443 A1  Feb. 28, 2019

(30) Foreign Application Priority Data

Aug. 31, 2017  (CN) .......................... 2017 1 0774160

(51) Int. Cl.
*B60C 25/05* (2006.01)
*B60C 25/132* (2006.01)
*B23Q 3/06* (2006.01)
*B23Q 3/10* (2006.01)

(52) U.S. Cl.
CPC .......... *B60C 25/0521* (2013.01); *B23Q 3/062* (2013.01); *B60C 25/0563* (2013.01); *B60C 25/132* (2013.01); *B23Q 3/106* (2013.01); *B60C 25/0539* (2013.01)

(58) Field of Classification Search
CPC ............ B60C 25/0539; B60C 25/0521; B60C 25/0563; B23Q 3/062; B23Q 3/06
See application file for complete search history.

(56) References Cited

U.S. PATENT DOCUMENTS

| 6,062,289 A * | 5/2000 | Cunningham ...... B60C 25/0545 157/14 |
| 7,201,204 B2 * | 4/2007 | Corghi ................ B60C 25/0545 157/16 |
| 9,085,204 B2 * | 7/2015 | Bertrand ............. B60C 25/0539 |
| 2005/0199349 A1 * | 9/2005 | Matteucci ........... B60C 25/0545 157/16 |

* cited by examiner

*Primary Examiner* — David B. Thomas
(74) *Attorney, Agent, or Firm* — Cooper Legal Group, LLC

(57) ABSTRACT

A fixture for eccentric clamping of a wheel is composed of a base (1), a cylinder (2), a cylinder support (3), a connecting seat (4), a movable positioning seat (5), a guide rail sliding seat (6), a linear guide rail (7) and a fixed positioning seat (8), wherein the cylinder support (3), the linear guide rail (7) and the fixed positioning seat (8) are fixed on the base (1), the cylinder (2) is mounted on the cylinder support (3), an output shaft of the cylinder (2) is connected with the connecting seat (4), the connecting seat (4) is connected with the linear guide rail (7) via the guide rail sliding seat (6), the movable positioning seat (5) is fixed on the connecting seat (4), and the cylinder (2) is configured to drive the connecting seat (4) and the movable positioning seat (5) to move along the linear guide rail (7).

7 Claims, 4 Drawing Sheets

FIXTURE FOR ECCENTRIC CLAMPING OF WHEEL

CROSS-REFERENCE TO RELATED APPLICATIONS

The present application claims benefit of Chinese Patent Application No. 201710774160.5, filed on Aug. 31, 2017, the contents of which are hereby incorporated by reference in its entirety.

BACKGROUND

As the labor cost gradually increases, wheel enterprises gradually adopt automatic production. Since different sizes of wheels are produced every day, automatic fixtures need to meet the clamping of different sizes of wheels. This problem is also one of the obstacles that puzzle the development of automatic production in the wheel production industry. The present disclosure introduces a fixture for implementing mixed-line clamping of a wheel by eccentricity prevention.

SUMMARY

The present disclosure relates to a wheel positioning device, specifically to a fixture for implementing mixed-line clamping of a wheel by eccentrically placing the wheel.

The object of the present disclosure to provide an universal fixture for eccentric clamping of a wheel.

In order to achieve the above object, the technical solution of the present disclosure is: an universal fixture for eccentric clamping of a wheel is mainly composed of a base, a cylinder, a cylinder support, a connecting seat, a movable positioning seat, a guide rail sliding seat, a linear guide rail and a fixed positioning seat, in which the cylinder support, the linear guide rail and the fixed positioning seat are fixed on the base, the cylinder is mounted on the cylinder support, an output shaft of the cylinder is connected with the connecting seat, the connecting seat is connected with the linear guide rail via the guide rail sliding seat, and the movable positioning seat is fixed on the connecting seat;

The movable positioning seat and the fixed positioning seat are of step arc-shaped structures, and the positioning surfaces are inclined surfaces, in which the step height differences H are 12.7 mm, the platform surfaces L are 12.7 mm, and the inclined angles of the positioning inclined surfaces are 45 degrees;

The center of the initial position of the movable positioning seat is O1, the center of the fixed positioning seat is O2, O2 is also the center of the fixture, and the distance between O1 and O2 is 5 mm;

O1 is the center when a wheel is placed, the front wheel lip of the wheel falls within the platform surfaces H of the movable positioning seat and the fixed positioning seat, the cylinder can drive the connecting seat and the movable positioning seat to move along the linear guide rail, finally, the positioning inclined surface of the fixed positioning seat contacts the wheel lip, the center of the wheel is superposed with O2 and superposed with the center of the fixture, and the clamping of the wheel is completed.

In an aspect of the present disclosure, provided is a fixture for eccentric clamping of a wheel, which is composed of a base, a cylinder, a cylinder support, a connecting seat, a movable positioning seat, a guide rail sliding seat, a linear guide rail and a fixed positioning seat.

The cylinder support, the linear guide rail and the fixed positioning seat are fixed on the base, the cylinder is mounted on the cylinder support, an output shaft of the cylinder is connected with the connecting seat, the connecting seat is connected with the linear guide rail via the guide rail sliding seat, the movable positioning seat is fixed on the connecting seat, and the cylinder is configured to drive the connecting seat and the movable positioning seat to move along the linear guide rail.

In a preferred aspect of the present disclosure, the movable positioning seat and the fixed positioning seat are of step arc-shaped structures, and the positioning surfaces are inclined surfaces.

In a preferred aspect of the present disclosure, the step height differences are 8-15 mm, the platform surface widths are 8-15 mm, and the inclined angles of the positioning inclined surfaces are 37-55 degrees.

In a preferred aspect of the present disclosure, the step height differences are 12.7 mm, the platform surface widths are 12.7 mm, and the inclined angles of the positioning inclined surfaces are 45 degrees.

In a preferred aspect of the present disclosure, the distance between the center of the initial position of the movable positioning seat and the center of the fixed positioning seat is 3.5-8.5 mm, and the center of the fixed positioning seat is superposed with the center of the fixture.

In a preferred aspect of the present disclosure, the distance between the center of the initial position of the movable positioning seat and the center of the fixed positioning seat is 5 mm.

In a preferred aspect of the present disclosure, the fixture allows the front wheel lip of a wheel to fall within the platform surfaces H of the movable positioning seat and the fixed positioning seat, the cylinder drives the connecting seat and the movable positioning seat to move along the linear guide rail, finally, the positioning inclined surface of the fixed positioning seat contacts the wheel lip, the center of the wheel is superposed with the center of the fixed positioning seat and superposed with the center of the fixture, and the clamping of the wheel is completed.

In actual use, a manipulator places the wheel on the fixture, the front wheel lip of the wheel falls within the platform surfaces H of the movable positioning seat and the fixed positioning seat, the cylinder can drive the connecting seat and the movable positioning seat to move along the linear guide rail, finally, the positioning inclined surface of the fixed positioning seat contacts the wheel lip, and the center of the wheel is superposed with O2 and superposed with the center of the fixture. So far, the clamping process of the wheel is completed.

The fixture in use can meet the requirement for mixed-line clamping of a wheel, is ideal in effect, high in efficiency, safe, reliable and high in automation, and is particularly suitable for mass production on a production line.

BRIEF DESCRIPTION OF DRAWINGS

The embodiments of the present disclosure will be described in detail below in combination with the accompanying drawings, in which.

Figure 1A:
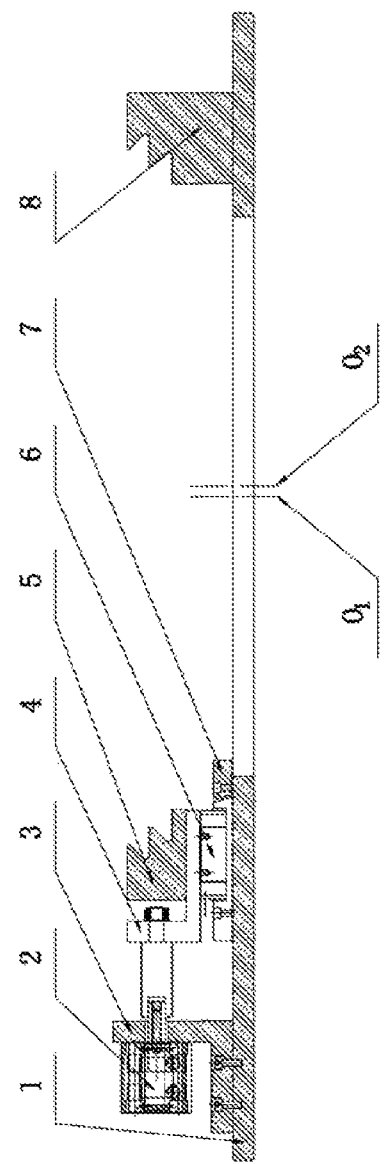
FIGS. 1A-1B are structure diagrams of an universal fixture for eccentric clamping of a wheel according to the present disclosure.
Figure 1B:
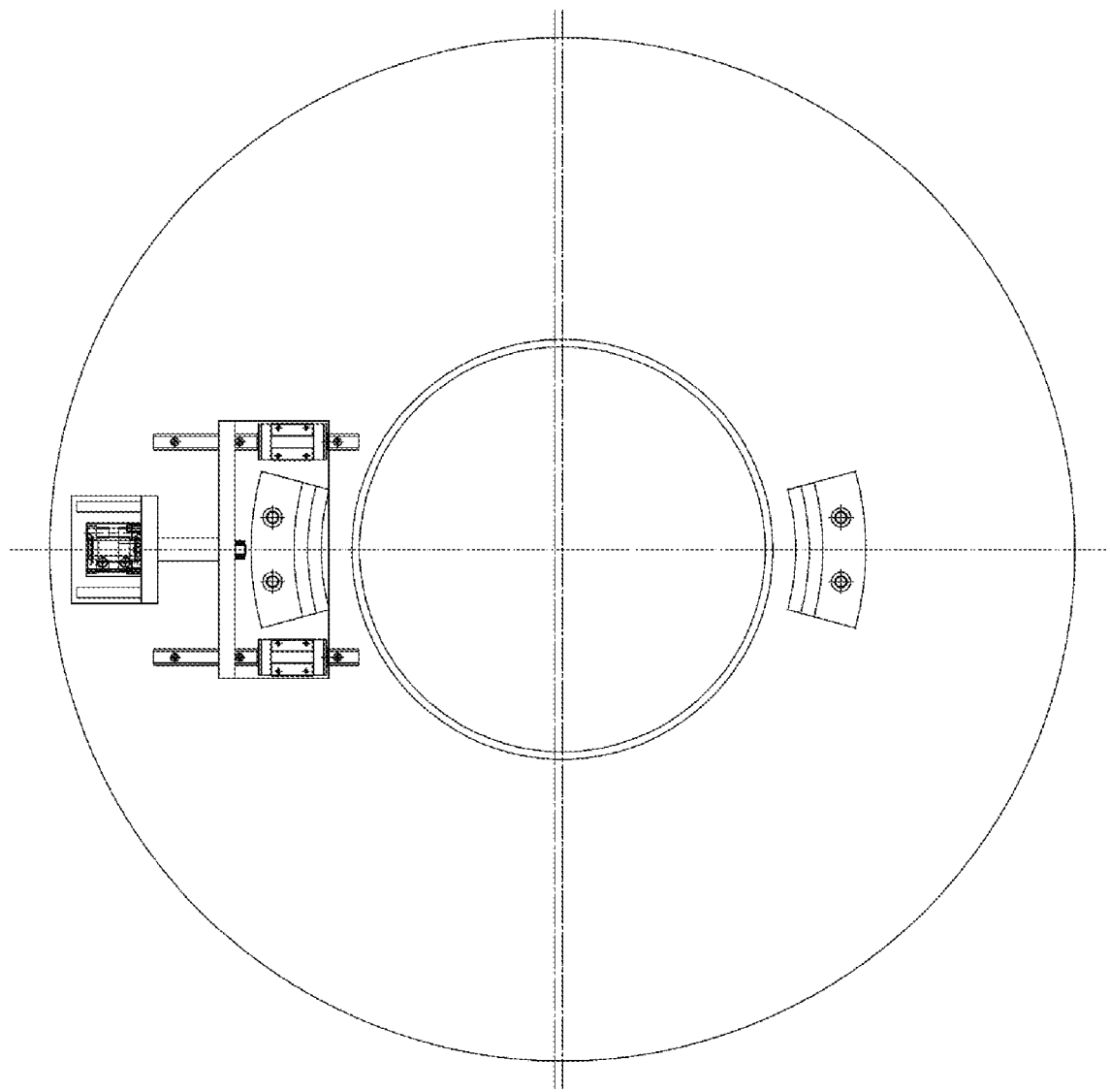
Figure 2A:
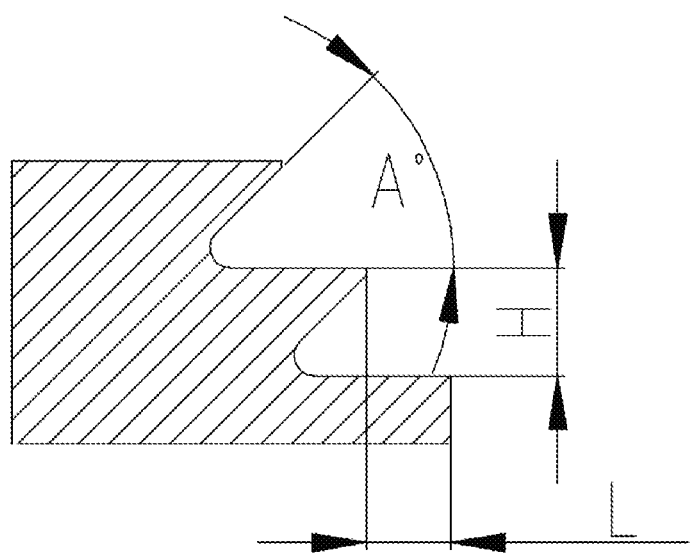
FIGS. 2A-2B are structure diagrams of a movable positioning block in the universal fixture for eccentric clamping of a wheel according to the present disclosure.
Figure 2B:
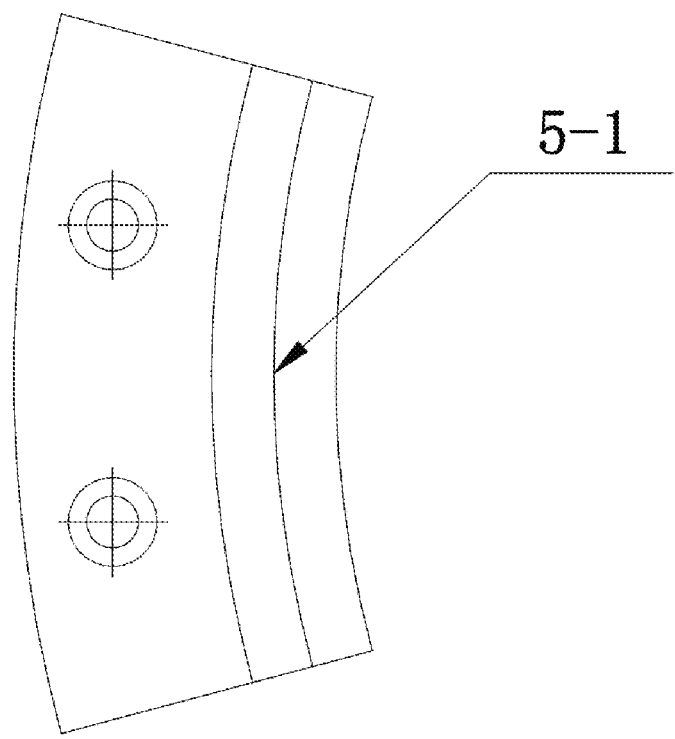
Figure 3A:
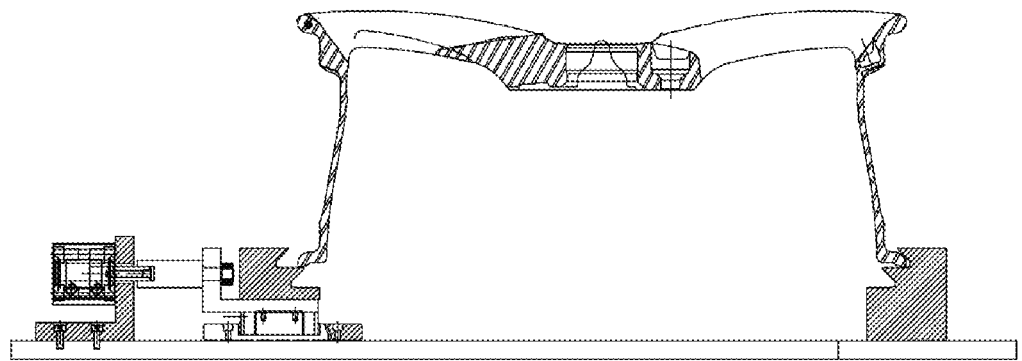
FIGS. 3A-3B are structure diagrams when the universal fixture for eccentric clamping of a wheel according to the present disclosure works.
Figure 3B:
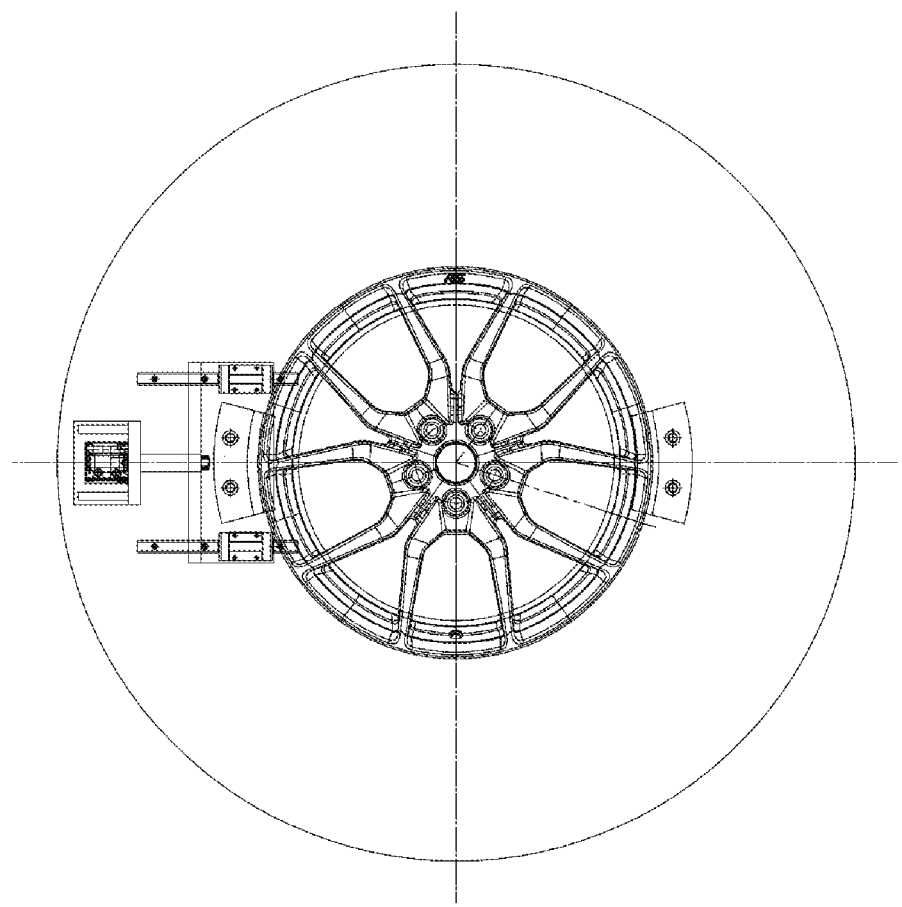

LIST OF REFERENCE SYMBOLS 1 base
2 cylinder
3 cylinder support
4 connecting seat
5 movable positioning seat
6 guide rail sliding seat
7 linear guide rail
8 fixed positioning seat

DETAILED DESCRIPTION

Embodiment 1

The details and working conditions of the specific device according to the present disclosure will be described in detail below in combination with the drawings.

An universal fixture for eccentric clamping of a wheel according to the present disclosure is mainly composed of a base 1, a cylinder 2, a cylinder support 3, a connecting seat 4, a movable positioning seat 5, a guide rail sliding seat 6, a linear guide rail 7 and a fixed positioning seat 8, in which the cylinder support 3, the linear guide rail 7 and the fixed positioning seat 8 are fixed on the base 1, the cylinder 2 is mounted on the cylinder support 3, an output shaft of the cylinder 2 is connected with the connecting seat 4, the connecting seat 4 is connected with the linear guide rail 7 via the guide rail sliding seat 6, and the movable positioning seat 5 is fixed on the connecting seat 4; the movable positioning seat 5 and the fixed positioning seat 8 are of step arc-shaped structures 5-1, and the positioning surfaces are inclined surfaces, in which the step height differences H are 12.7 mm, the platform surfaces L are 12.7 mm, and the inclined angles of the positioning inclined surfaces are 45 degrees; the center of the initial position of the movable positioning seat 5 is O1, the center of the fixed positioning seat 8 is O2, O2 is also the center of the fixture, and the distance between O1 and O2 is 5 mm; O1 is the center when a wheel is placed, the front wheel lip of the wheel falls within the platform surfaces H of the movable positioning seat 5 and the fixed positioning seat 8, the cylinder 2 can drive the connecting seat 4 and the movable positioning seat 5 to move along the linear guide rail 7, finally, the positioning inclined surface of the fixed positioning seat 8 contacts the wheel lip, the center of the wheel is superposed with O2 and superposed with the center of the fixture, and the clamping of the wheel is completed.

In actual use, a manipulator places the wheel on the fixture, the front wheel lip of the wheel falls within the platform surfaces H of the movable positioning seat 5 and the fixed positioning seat 8, the cylinder 2 can drive the connecting seat 4 and the movable positioning seat 5 to move along the linear guide rail 7, finally, the positioning inclined surface of the fixed positioning seat 8 contacts the wheel lip, and the center of the wheel is superposed with O2 and superposed with the center of the fixture. So far, the clamping process of the wheel is completed.

The invention claimed is:

1. A fixture for eccentric clamping of a wheel, being composed of a base, a cylinder, a cylinder support, a connecting seat, a movable positioning seat, a guide rail sliding seat, a linear guide rail and a fixed positioning seat, wherein the cylinder support, the linear guide rail and the fixed positioning seat are fixed on the base, the cylinder is mounted on the cylinder support, an output shaft of the cylinder is connected with the connecting seat, the connecting seat is connected with the linear guide rail via the guide rail sliding seat, the movable positioning seat is fixed on the connecting seat, and the cylinder is configured to drive the connecting seat and the movable positioning seat to move along the linear guide rail.

2. The fixture according to claim 1, wherein the movable positioning seat and the fixed positioning seat are of step arc-shaped structures, and positioning surfaces are inclined surfaces.

3. The fixture according to claim 1, wherein step height differences are 8-15 mm, platform surface widths are 8-15 mm, and inclined angles of the positioning inclined surfaces are 37-55 degrees.

4. The fixture according to claim 3, wherein the step height differences are 12.7 mm, the platform surface widths are 12.7 mm, and the inclined angles of the positioning inclined surfaces are 45 degrees.

5. The fixture according to claim 1, wherein the distance between the center of an initial position of the movable positioning seat and the center of the fixed positioning seat is 3.5-8.5 mm, and the center of the fixed positioning seat is superposed with the center of the fixture.

6. The fixture according to claim 1, wherein the distance between the center of an initial position of the movable positioning seat and the center of the fixed positioning seat is 5 mm.

7. The fixture according to claim 1, wherein the fixture allows a front wheel lip of the wheel to fall within platform surfaces of the movable positioning seat and the fixed positioning seat, the cylinder drives the connecting seat and the movable positioning seat to move along the linear guide rail, finally, the positioning inclined surface of the fixed positioning seat contacts the wheel lip, the center of the wheel is superposed with the center of the fixed positioning seat and superposed with the center of the fixture, and the clamping of the wheel is completed.

* * * * *